(12) United States Patent
Miller et al.

(10) Patent No.: US 8,825,619 B2
(45) Date of Patent: *Sep. 2, 2014

(54) SYSTEMS AND METHODS FOR MANAGING DATABASE AUTHENTICATION AND SESSIONS

(75) Inventors: Todd Miller, Pacific Grove, CA (US); Brian Schelp, New Hyde Park, NY (US); Paul Duncan, Apalachin, NY (US)

(73) Assignee: Proquest, LLC, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/573,088

(22) Filed: Aug. 20, 2012

(65) Prior Publication Data

US 2012/0317623 A1     Dec. 13, 2012

Related U.S. Application Data

(60) Continuation of application No. 12/927,018, filed on Nov. 3, 2010, now Pat. No. 8,250,050, which is a continuation of application No. 11/012,780, filed on Dec. 14, 2004, now Pat. No. 7,831,616, which is a continuation-in-part of application No. 10/969,112, filed on Oct. 19, 2004, which is a division of application No. 10/669,312, filed on Sep. 23, 2003, now Pat. No. 6,807,539.

(60) Provisional application No. 60/200,044, filed on Apr. 27, 2000.

(51) Int. Cl.
*G06F 17/30* (2006.01)

(52) U.S. Cl.
USPC .......... 707/705; 707/781; 707/769; 707/770; 709/229

(58) Field of Classification Search
USPC ................... 707/705, 781, 769, 770
See application file for complete search history.

(56) References Cited

U.S. PATENT DOCUMENTS

| | | | |
|---|---|---|---|
| 6,587,880 B1 * | 7/2003 | Saigo et al. | 709/225 |
| 7,089,231 B2 * | 8/2006 | Hirata et al. | 1/1 |

* cited by examiner

*Primary Examiner* — Hung Q Pham
(74) *Attorney, Agent, or Firm* — Patula & Associates, P.C.

(57) ABSTRACT

Systems and methods enable remote (or "off-campus") users complete authorized access to full-record content of 3rd-party databases subscribed to by the user's institution. More particularly, the present invention relates to a method and system that acts as a transparent conduit between the user and a remote database, managing relevant session/context information without the user's awareness and without the need for users to install plug-ins or configure browser proxies.

2 Claims, 8 Drawing Sheets

SYSTEMS AND METHODS FOR MANAGING DATABASE AUTHENTICATION AND SESSIONS

This application is a continuation of U.S. patent application Ser. No. 12/927,018 filed Nov. 3, 2010, now U.S. Pat. No. 8,250,050 issued Aug. 21, 2012, which is a continuation of U.S. patent application Ser. No. 11/012,780 filed Dec. 14, 2004, now U.S. Pat. No. 7,831,616 issued Nov. 9, 2010, which is a continuation-in-part of U.S. application Ser. No. 10/969,112 filed, Oct. 19, 2004, which is a divisional of U.S. Ser. No. 10/669,312 filed Sep. 23, 2003, now U.S. Pat. No. 6,807,539 issued Oct. 19, 2004, which claims the benefit of U.S. application Ser. No. 09/844,787 filed, Apr. 27, 2001 which claims priority under 35 U.S.C. §119 from U.S. Provisional Patent Application Ser. No. 60/200,044 filed on Apr. 27, 2000, the disclosure of which is hereby incorporated by reference in its entirety for all purposes.

FIELD OF THE INVENTION

The field of the invention is electronic information storage and retrieval.

BACKGROUND

The introduction of the Internet and the World Wide Web ("Web") has made a voluminous amount of information available to people having access to the Web. The Web has effectively made libraries virtual in the sense that physical volumes are no longer required to reside in a single physical location. At present, some 80+ million digital forms of publications have been tied to the Web, representing trillions of pages of information. While the amount of information which appears to be available through the Web is staggering, the reality is that the majority of research-quality information is completely inaccessible using conventional information search tools such as a general-purpose search engine.

Certain information is not available via the Web using conventional information search tools such as Google, because such information resides on commercial web-interfaced databases and information sources whose content cannot be accessed with a traditional search engines. A recent development in information technology is the "Federated Search Engine" which enables users to simultaneously search multiple disparate information sources containing research quality information unavailable through traditional search engines such as Google.

The content of these databases is usually offered on a paid basis, and is restricted by an authentication and session management mechanism. The authentication mechanisms are frequently complex, and typically involve some combination of IP (Internet Protocol) recognition, referrer URL, alternate URL, SSL, username/password, proprietary schemes, or some combination of these methods. In order to access this information, a user is typically required to subscribe to this commercial information source, authenticate to obtain access to the website, and then query the information using the information source's own proprietary search mechanism.

Once a user receives results from a query, these are normally in the form of citations or some other index, or abridged record. Typically, the user will request the full record referenced by these citations by clicking on a HTML link presented within the record. Once the full record is requested, the proprietary search engine used by the information source retrieves the requested full record associated with the citation. In order to accomplish this, this information is retrieved within the context of a session which has been initiated by the search engine. If the session is interrupted, it is not possible to retrieve the full record.

A significant problem encountered in the course of attempting to perform a federated search against the commercial information sources described is the ability to transparently authenticate the user simultaneously into multiple information sources. Additionally, it is especially difficult to maintain the context-sensitive session required to retrieve full records associated with the citations or abridged record results retrieved in the federated search query. Finally, because of the difficulty incurred in managing authentication and context-sensitive sessions, it is difficult to display the full record within its true native interface, with all native functionality intact, such as links, and various features and functions, such as the ability to refine a search query, email, print, or save results, or to perform advanced native functions A related problem is one of diagnosing user session malfunctions caused by network configuration problems, firewall configuration problems, proxy problems, etc. Diagnosing these database session malfunctions is normally a time-consuming manual process. A further related problem is one of user/database browser mismatches, where certain databases are incompatible with the growing variety of web browsers.

Finally, tracking and reporting granular session-context-sensitive usage information across multiple databases is an extremely time-consuming process, requiring subscribers to these databases to request and normalize reports from dozens or hundreds of different database content providers. These reports track and report inconsistent metrics with non-standard labels and definitions.

SUMMARY OF THE INVENTION

The present invention provides systems and methods that enable remote ("off-campus") users authorized access to full-record content of 3rd-party databases.

In preferred embodiments, the methods and systems act as a transparent conduit between the user and a remote database, managing relevant session/context information without the user's awareness, and without the need for users to install plug-ins or configure browser proxies. In especially preferred embodiments the access to any of the multiple databases is as complete as it would be if the user were individually accessing the databases.

Contemplated methods and systems could be applied to many different environments, but can be especially useful for schools and libraries, government agencies, larger companies, and other institutions that subscribe to multiple fees for service databases.

According to one aspect of the inventive subject matter, specialized authentication and session management software (ASM software) manages and uses a search context to enable the user's access to the full native database experience. This context includes not only authorization information confirming the user's right to access the database full-record information, but other contextual elements necessary to properly manage the user's access to, and navigation in, the database resources.

According to another aspect, the ASM software also manages authorization information required by each user/database session. For HTTP-accessed databases, usually this includes sending a required set of session cookies defined during the search's authentication step. The subscription databases typically require these cookies as evidence of prior successful user authentication. In addition the ASM software can manage any other authentication-related attributes required for access such as originating IP address, referring URL, username/password authorization headers, and so on. All of these attributes are managed without awareness required of the user.

In yet a third aspect, the ASM software manages session attributes required for functional or contextual continuity. For example, preferred embodiments of the ASM software can handle a full-record URL link that can only be successfully displayed in a browser within an HTML frameset. The ASM software would then cause the user's browser to construct a frameset which would subsequently be used to fetch the target resource URL. Especially preferred embodiments can also make adjustments to a session to accommodate database-specific browser requirements. Thus when the ASM software is managing a user's session, it can alter the transaction headers sent to a database to satisfy certain browser-level checks made by some databases. Some databases check these incorrectly, but preferred embodiments of the present invention are able to compensate in a manner completely transparent to the user.

The inventive subject matter can advantageously be implemented as an independent service, which could handle full-record requests as a consequence of a user searching databases using another component. Among other things, the underlying ASM software for the service would package and transfer all needed authentication and session context information from the search component to perform a subsequent search among many databases. In preferred implementations, the base code used to manage search activity packages up all relevant context information described above (cookies, referring URLs, IP addresses, username/passwords, framesets, user-agent headers, etc.). When a user click's on a full-record link built by the search component, it causes all the contextual information to be sent, along with the link, to the ASM software for handling. The ASM software can then reconstruct the entire relevant context and proceed with the user's request as if the entire authentication/search/full-record request had been done through a native browser session.

The packaging and transfer of session context information enables configuration flexibility, in particular enabling the transparent remote authenticated access to subscription resources mentioned above. It also means that the ASM software can run on a separate server from the search component. The context packaging and protocols can also be used for unique requirements not involving an initial search activity such as enabling remote user access directly to an institution's subscription database without having to explicitly contend with any authentication steps.

Because the ASM software is the conduit for a session between a user/browser and a native subscription database, it is able to log transaction activity to any level of detail. Logging information is typically used by institutions to track the amount of use each of its subscription databases gets by all of its users. Detailed logging information can also be used to diagnose user session problems in a manner impossible had the ASM software not been present.

In an exemplary embodiment, the bundling of URL and context is done via JavaScript functions and data components built into the search results by the search engine. Upon the user's action of selecting a URL to access (by clicking a hyperlink for example) JavaScript functions package the URL and context data into a standard HTTP POST method transaction sent via TCP over a network to the session service waiting to handle such requests.

Another embodiment keeps the logical association of URL and context data but breaks their physical proximity by incorporating a URL and reference to the context rather than URL and context directly. This enables the context information to be stored independent of the user results presentation. The association between URL and context is then made via the reference by the session service.

Many alternative embodiments exist for various aspects of the session service. While the exemplary embodiment implies that the session service is separate and independent of the search service, it can in fact reside co-resident on the same server, on a different server, or could be functionally incorporated into the search service itself.

In all cases, the common aspects of the embodiments include the search service's building of contexts during search activities, creating URL/context representations and logical associations during the construction of the search results, the use of the URL/context data associations by the session service, and the enabling of a continuing virtually-native dialog between user and database by way of the state-managed session service.

Reference to the remaining portions of the specification, including the drawings and claims, will realize other features and advantages of the inventive subject matter. Further features and advantages of the inventive subject matter, as well as the structure and operation of various embodiments of the inventive subject matter, are described in detail below with respect to accompanying drawings, like reference numbers indicate identical or functionally similar elements.

DESCRIPTION

Figure 1:
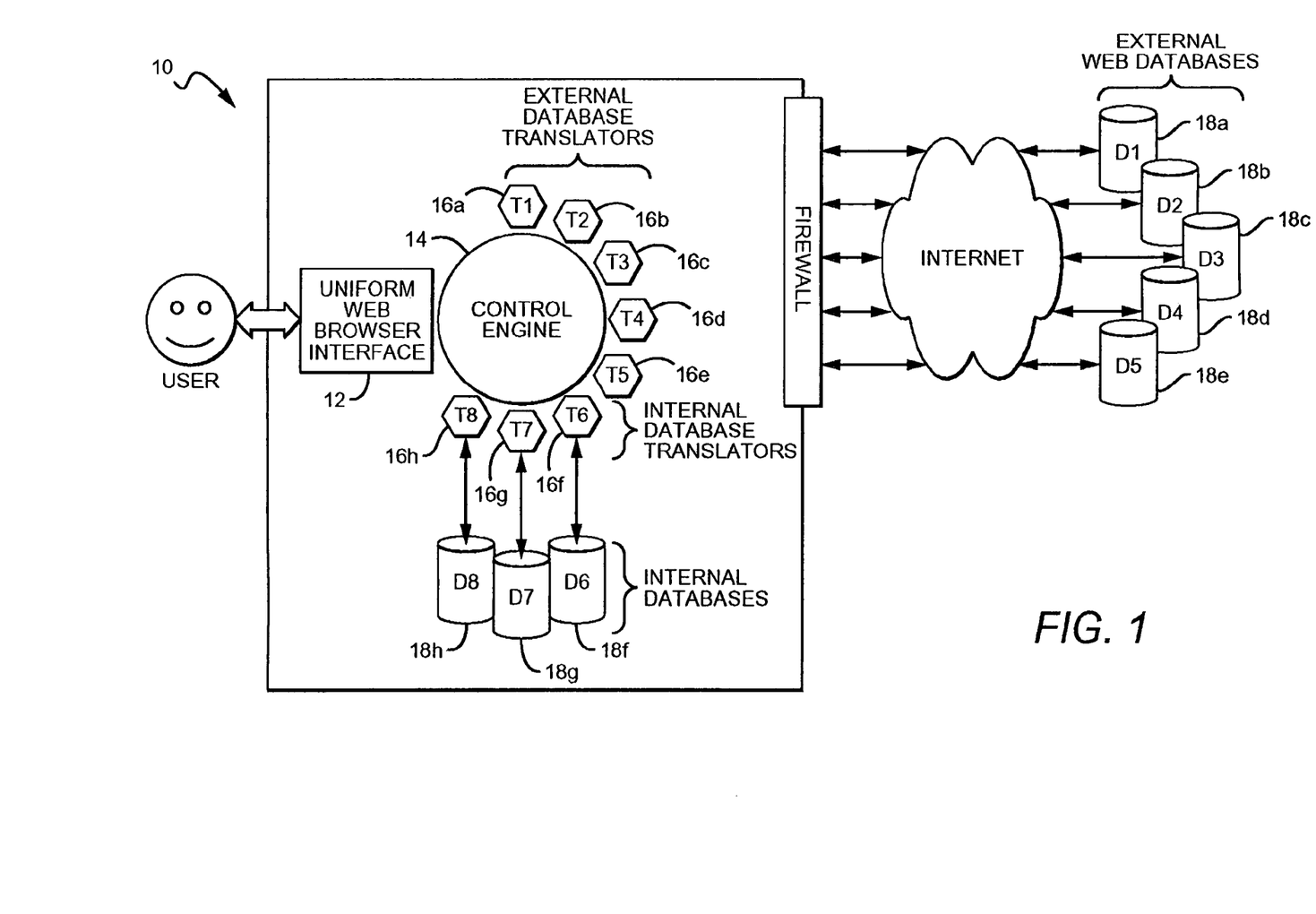
FIG. 1 is a simplified schematic diagram showing an exemplary embodiment of the present invention.

FIG. 1 is a simplified schematic diagram showing an exemplary embodiment of the present invention. In this exemplary embodiment, the system 10 includes a user interface 12, a control engine 14, and a number of translators 16a-h.

In an exemplary embodiment, the system 10 including the user interface 12, the control engine 14 and the translators 16a-h is implemented using computer software in either an integrated or modular manner. It should be understood that the system 10 may be implemented using software, hardware, or a combination of both. Based on the disclosure provided herein, a person of ordinary skill in the art should know of other ways, methods and techniques to implement the present invention.

Preferably, the system 10 resides on a single server (not shown). However, it should be understood that the system 10 need not reside on a single server. Different parts of the system 10, such as the user interface 12, the control engine 14 and the translators 16a-h may be made to reside on different servers depending on the design specifications and requirements. Furthermore, the server can be an internal server maintained by the user's company or a server maintained by the ISP of the user's company or any server that is accessible via a computer network.

Figure 2:
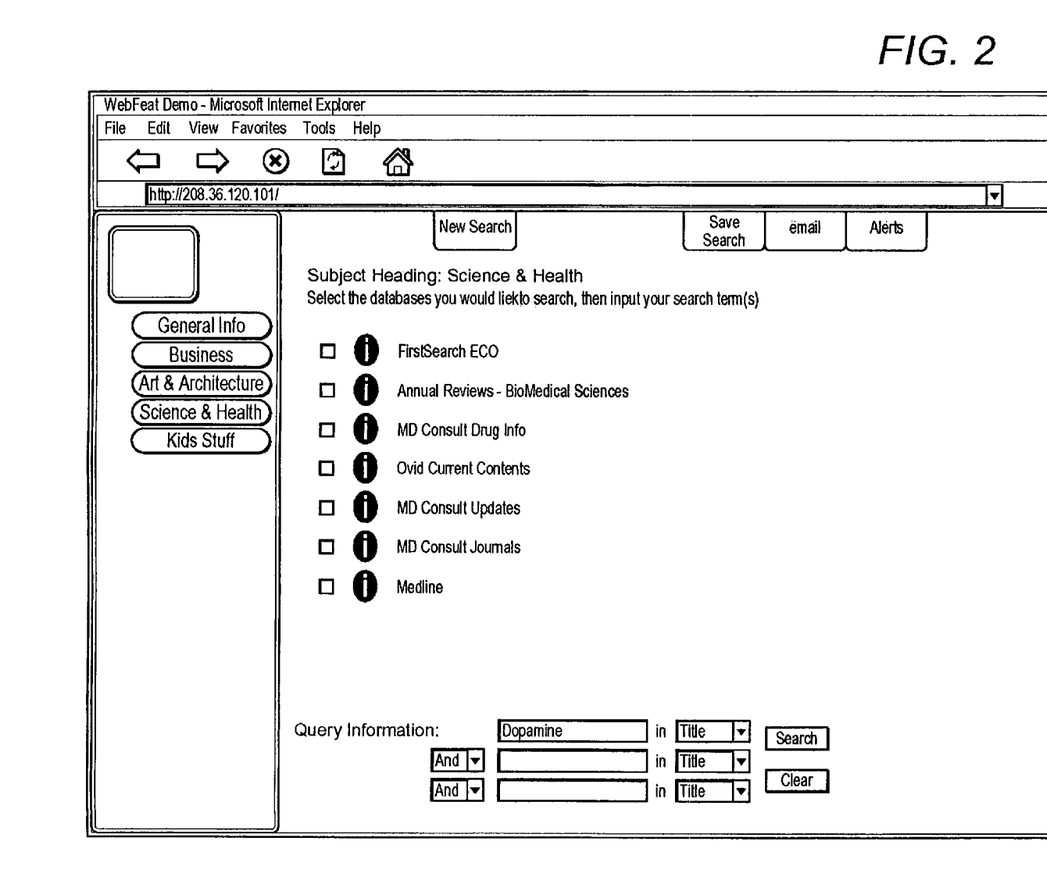
FIG. 2 is a diagram showing a first exemplary embodiment of a user interface in accordance with the present invention.

In FIG. 2 an exemplary embodiment of the user interface 12 is shown. In the exemplary embodiment, the user interface 12 allows a user to enter the desired search term(s) and other pertinent information for his/her search. The user interface 12 can be designed to allow the user to select different search strategies. For example, both novice key word search and advanced multi-term Boolean search can be provided as options.

Furthermore, the user interface 12 also allows the user to select or specify one or more of the available databases where the search is to be conducted. For example, the user may specify to search databases from various database providers such as Compendex®, Derwent®, ABI Infom/ProQuest®, Disclosure, and PR Newswire. Referring to FIG. 1, the user may via the user interface 12 select or specify databases 18a-c and 18f to be searched.

By using the user interface 12, the search term(s) only need to be entered once for a single search. As a result, the user can obviate the need to repeatedly enter the same search term(s) where more than one database is to be searched. The search term(s) and other pertinent information entered by the user are then passed by the user interface 12 to the control engine 14. As will be explained further below, the control engine 14 then forwards the search term(s) and other pertinent information to each of the translators 16 which corresponds to the specified databases 18 thereby enabling the translators 16 to access the specified databases 18. For example, assuming that translators 16a-c and 16f correspond to databases 18a-c and 18f, if the user specifies to have databases 18a-c and 18f searched, then the control engine 14 forwards the search terms) and other pertinent information to translators 16a-c and 16f.

In one embodiment, the user interface 12 is implemented using a standard web browser, such as the Microsoft® Internet Explorer®, the Netscape® Navigator®, and the like. It should be understood that while only one user interface 12 is shown herein, a multitude of interfaces 12 can be implemented to allow multiple users to conduct their respective searches concurrently. For example, the user interface 12 can be made available on a company intranet via a clickable icon. One or more users can click on the icon thereby allowing respective searches to be performed on one or more of the available databases 18a-h.

Figure 3:
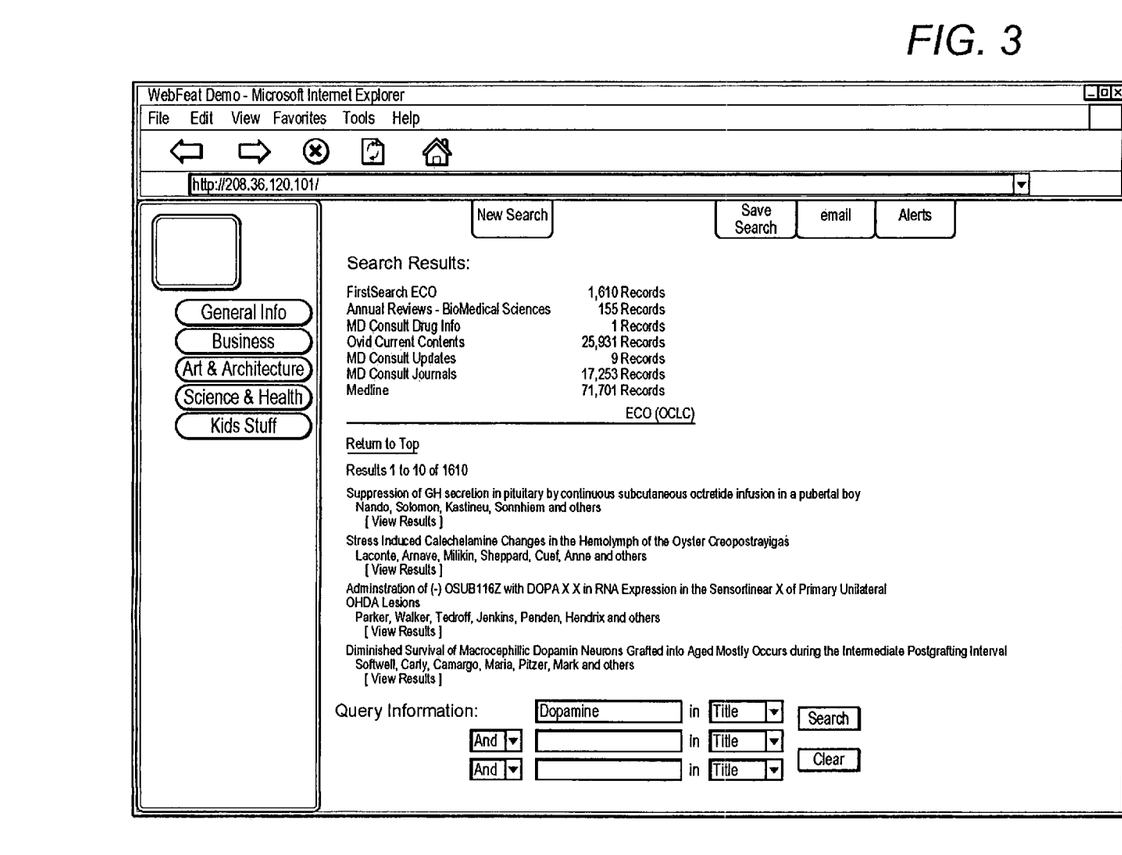
FIG. 3 is a diagram showing a second exemplary embodiment of a user interface in accordance with the present invention.

In FIG. 3 the user interface 12 further displays the results of the search to the user. For example, the search results are shown to the user in a summary format using hyperlinks. Hyperlinks may be implemented using HTML but other presentation or markup languages such as DHTML, XML, etc. can be used. The results displayed to the user are consolidated results retrieved from the various specified databases. As will be explained further below, the control engine 14 receives the respective results from the translators 16a-h and consolidates such results for presentation to the user via the user interface 12.

Figure 4:
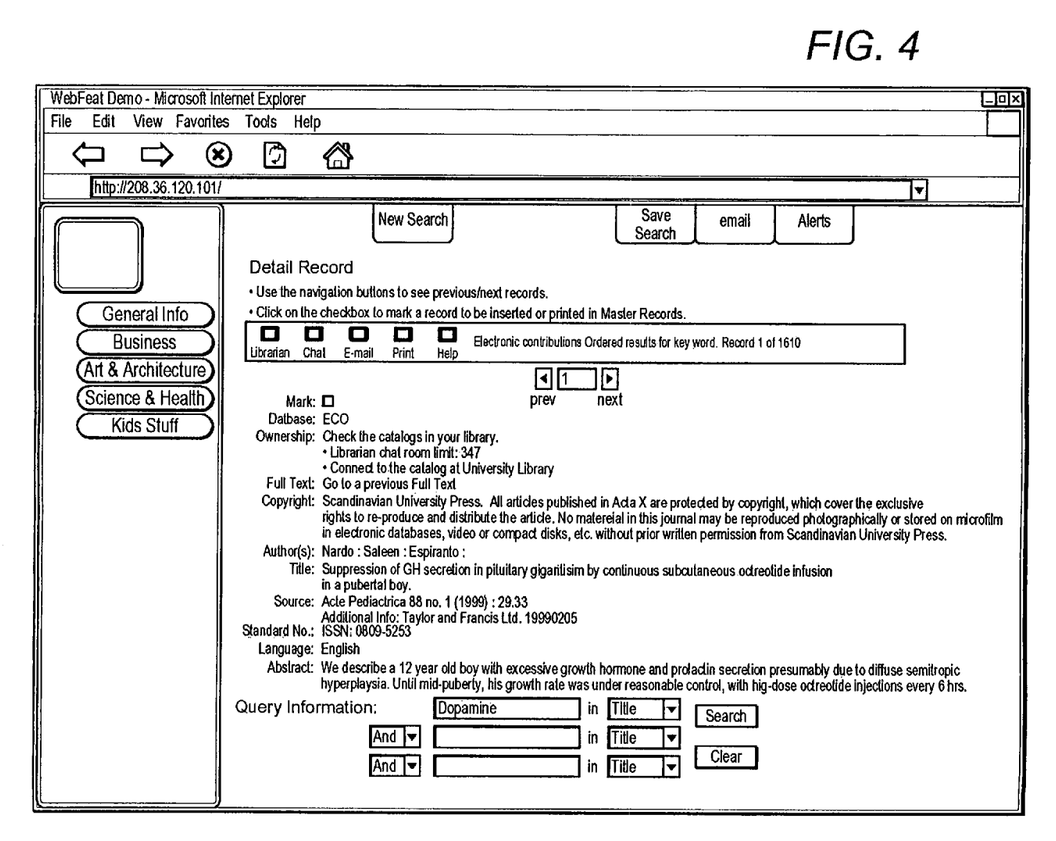
FIG. 4 is a diagram showing a third exemplary embodiment of a user interface in accordance with the present invention.

In FIG. 4, the user interface 12, upon selection of a corresponding hyperlink by the user, also displays the corresponding full record of a search result to the user. As mentioned above, the search results may be shown to the user in a summary format using hyperlinks. If the user desires to learn more about a particular search result, the user may simply click on the corresponding hyperlink to view the corresponding full record. As will be explained further below, the translators 16 create the respective hyperlinks which correspond to the search results thereby allowing the user interface 12 to display the corresponding full record accordingly upon activation of the corresponding hyperlink.

In an alternative embodiment, the user interface 12 is implemented in the form of a user agent such as an application program. Similarly, the user agent is configured to receive search information and other pertinent information, either from a user or from any other source such as another application program. Furthermore, upon receiving the search results from the control engine 14, the user agent may further process such search results. Based on the disclosure provided herein, a person of ordinary skill in the art will know of ways, methods and techniques to implement the user interface 12 in accordance with the present invention.

The control engine 14 generally manages and controls operation of the system 10. As mentioned above, the control engine 14 forwards the search term(s) and other pertinent information received via the user interface 12 to all translators 16 which correspond to the specified databases 18. In an exemplary embodiment, the control engine 14 is multithreaded, which means that a new thread of execution is spawned to run a search for each of the specified databases 18a-h. By having the multi-threaded functionality, the control engine 14 allows multiple searches to be run in parallel. That is, all search requests to the respective specified databases 18a-h can be formulated and executed concurrently. In one embodiment, the control engine 14 is implemented using Microsoft's Visual C++. However, based on the disclosure provided herein, it should be apparent to a person of ordinary skill in the art that other computer languages, such as JAVA, can be used to implement the control engine 14 in accordance with the present invention.

The control engine 14 consolidates all the results received from the translators 16a-h. The consolidated results represent the collective search results retrieved from the various specified databases 18a-h. Preferably, the consolidated results are formatted using presentation or markup language such as HTML. The consolidated results are then forwarded to the user interface 12 to effectuate the appropriate display accordingly.

Access to the specified databases 18a-h is accomplished via the translators 16a-h. Each translator 16 is tailored specifically to interact with a corresponding database 18. The databases 18a-h which correspond to the translators 16a-h can either be Web-accessible or locally accessible. For example, referring to FIG. 1, databases 18a-e are accessible via the Web and databases 18f-h are databases which are connected to a company's internal network and are not accessible to the outside world.

As mentioned above, each database is accessed via a database interface. Such database interface is typically different for each database. For example, for Web-accessible databases, these databases may have database interfaces which are capable of handling communications and interface protocols such as HTTP, telnet, Z39.50 or others; and for locally accessible databases, these databases may have database interfaces which are capable of handling communications and interface protocols such as Microsoft®'s ODBC standard or other vendor specific standards. It should be noted that a database interface can be implemented in various forms. For example, a database interface can be a search engine or other searching mechanism which can be used to search or access a database. A person of ordinary skill in the art will know of ways, methods and techniques to implement a database interface.

Since each translator 16 is tailored to interact with a corresponding database 18, each translator 16, therefore, contains specific known information about the corresponding database interface including, for example, information relating to log-ins and search request syntax and format. The specific information about the corresponding database interface can be obtained, for example, by identifying different words, terms and formatting code used in a response received from the corresponding database. For instance, such information may be obtained from a HTTP response received from a database interface which is Web-accessible. The specific information about a corresponding database interface can also be obtained from the database providers or other sources.

Using the information, such as the search term(s), received from the user via the user interface 12 and the specific information pertaining to a corresponding database interface, the translator 16 first contacts the corresponding database interface to perform any required steps to satisfy database authorization requirements in order to establish a connection to the corresponding database 18. Once the connection is established, the translator 16 then formulates a search request which is recognizable by that corresponding database 18. In an exemplary embodiment, the translator 16 uses HTTP to establish the database connection and transmit the search request to that corresponding database 18. Referring to FIG. 1, for example, translator 16a can forward a search request to corresponding database 18a using HTTP via the Internet.

After the corresponding database 18 performs the search pursuant to the search request, the search results are returned to the corresponding translator 16. Similarly, in an exemplary embodiment, the search results are encoded using HTML. It should be understood that the search results can be encoded in other presentation or markup language and that the corresponding database 18 and translator 16 can communicate with one another using other communications and interface protocols.

After the search results are returned from the corresponding database 18, the translator 16 parses the search results to create a number of summary statistics and records and corresponding hyperlinks. The summary statistics and records and the corresponding hyperlinks are then forwarded to the control engine 14. The summary statistics and records and the corresponding hyperlinks are formatted using HTML, DHTML, XML or other appropriate markup language.

As described above, the control engine 14 consolidates the summary statistics and records and the corresponding hyperlinks received from all the translators 16a-h. The consolidated results are then forwarded to the user interface 12 to generate the appropriate display. The consolidated results represent the collective search results retrieved from the various specified databases.

Figure 5:
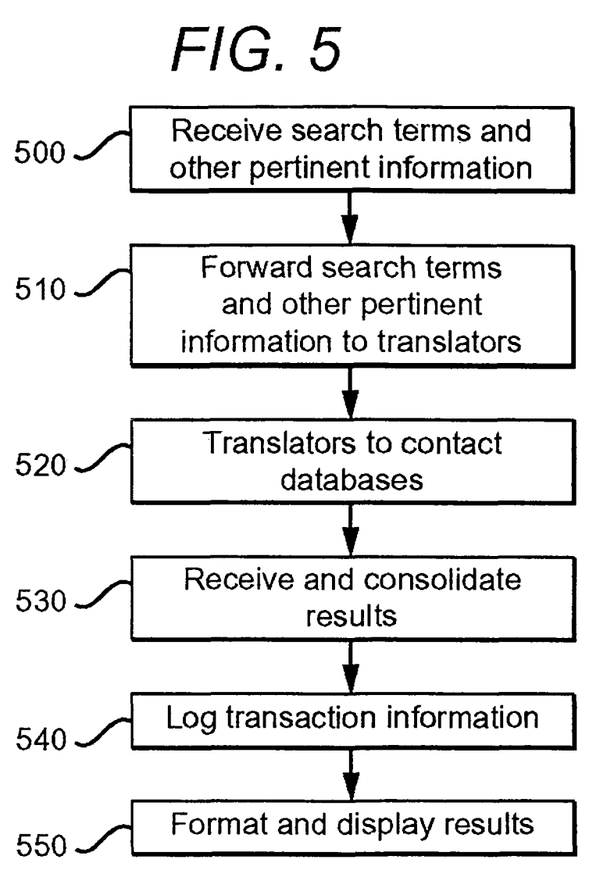
FIG. 5 is a simplified flow diagram illustrating operation of an exemplary embodiment of the present invention.

FIG. 5 is a simplified flow diagram illustrating operation of the system 10. At 500, the user via the user interface 12 provides the search term(s) or search query and other pertinent information and specifies which ones of the available databases 18a-h are to be searched. For example, the user can specify that databases 18a-c are to be searched.

At 510, the control engine 14 forwards the search term(s) and other pertinent information to the appropriate translators 16 which correspond to the specified databases 18. For example, if the user specifies that databases 18a-c are to be searched, then translators 16a-c receive the search term(s) and other pertinent information from the control engine 14.

At 520, the appropriate translators 16 contacts and forwards the search term(s) and other pertinent information to their respective specified databases 18 so as to enable searches to be performed in the specified databases 18. Additional details of this step is further provided below.

At 530, search results are received from the specified databases 18 by the corresponding translators 16. After receiving the respective search results from the corresponding databases 18, each translator 16 parses and tallies the search results returned from its corresponding database 18 and generate any desired summary statistics and records and corresponding hyperlinks. Summary statistics may include, for example, number of search results retrieved from each database 18. The translators 16 then forward the respective summary statistics and records and corresponding hyperlinks to the control engine 14. The control engine 14 consolidates such summary statistics and records and corresponding hyperlinks and forwards the consolidated results to the user interface 12.

At 540, the control engine 14 also logs and records all the transaction information to a transaction log.

At 550, the user interface 12 displays the consolidated results accordingly.

Figure 6:
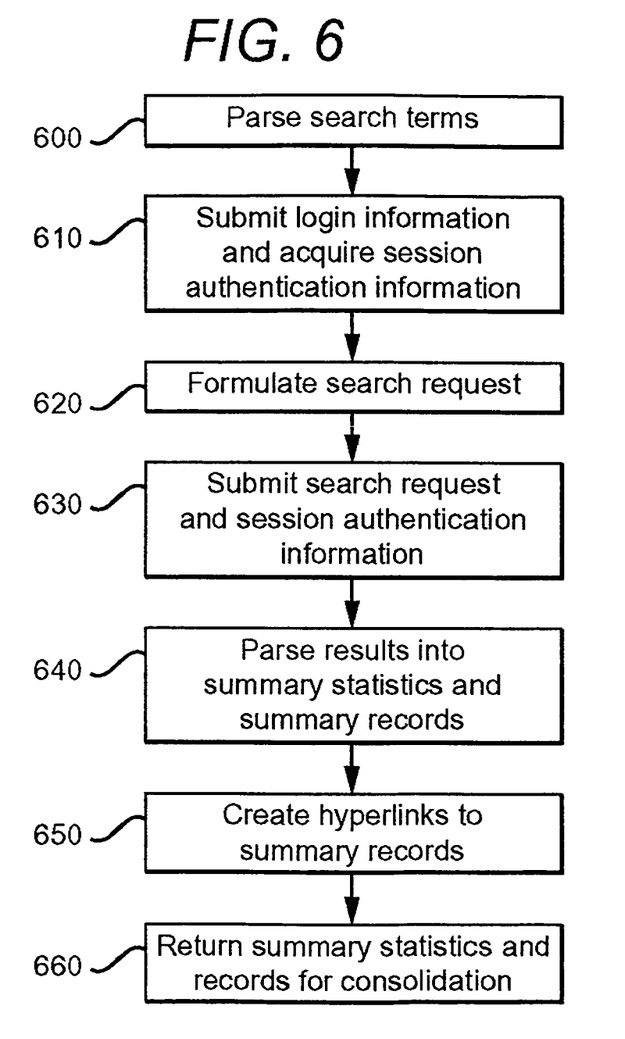
FIG. 6 is a simplified flow diagram further illustrating one aspect of operation as shown in FIG. 5.

FIG. 6 is a simplified flow diagram which further illustrates the operation of step 520 for each appropriate translator 16. At 600, a translator 16 parses the search terms) received from the control engine 14.

At 610, the translator 16 submits specific login and authorization information in order to establish access to the database interface of the corresponding database 18. Upon verification of the login and authorization information, session authentication information is returned to the translator 16.

At 620, upon verification of the login information and establishing access, the translator 16 then incorporates the search term(s) and other pertinent information into a search request which is recognizable by the corresponding database 18. As mentioned above, the search request is formulated specifically so as to allow it to be understood by the database interface of the corresponding database 18.

At 630, the search request and the session authentication information are transmitted to the database interface of the corresponding database 18. The search request is then carried out in the corresponding database 18.

At 640, search results are returned from the corresponding database 18 to the translator 16. The translator 16 parses the results into summary statistics and records. In an exemplary embodiment, the summary statistics and records are formatted in HTML.

At 650, the translator 16 further creates a number of hyperlinks which are linked to the summary records respectively. In the event that a summary record also has a corresponding full record, a hyperlink is also created to link the summary record and the corresponding full record together.

At 660, the translator 16 returns the summary statistics and records and all the created hyperlinks to the control engine 14 for consolidation with other summary statistics and records and hyperlinks received from other translators 16.

The following example further illustrates the operation of the system 10. Referring to FIG. 1, assume that translators 16a-h are tailored specifically to interact with databases 18a-h respectively. A user via the user interface 12 enters the desired search term(s) and other pertinent information and specifies that the search be conducted in databases 18a-c and 18f.

The control engine 14 then forwards the search term(s) and other pertinent information to translators 16a-c and 16f. Upon receiving the search term(s) and other pertinent information, translators 16a-c and 16f first concurrently contact database interfaces of databases 18a-c and 18f respectively to establish access connections.

When the access connections are established, translators 16*a-c* and 16*f* each perform necessary authorization steps so as to ensure that searches in the corresponding databases 18*a-c* and 18*f* can be conducted. Translators 16*a-c* and 16*f* then each incorporate the search term(s) and other pertinent information into a search request which is recognizable by their respective databases 18*a-c* and 18*f*. For example, the search request generated by translator 16*a* may utilize HTTP if database 18*a* is HTTP compatible; the search request generated by translator 16*b* may utilize telnet if database 18*b* is accessed using telnet; the search request generated by translator 16*c* may utilize Z39.50 if Z39.50 is used to access database 18*c*; and the search request generated by translator 16*f* may utilize ODBC if database 18*f* is designed using ODBC.

The search requests generated by translators 16*a-c* and 16*f* are then carried out in the respective databases 18*a-c* and 18*f*. The search results from each of the databases 18*a-c* and 18*f* are then returned to translators 16*a-c* and 16*f* respectively.

Each of translators 16*a-c* and 16*f* then parses the search results into summary statistics and records. In the event that there is a corresponding full record associated with a summary record, a hyperlink is created to link the summary record and the corresponding full record together. Translators 16*a-c* and 16*f* then forward all their respective summary statistics and records and hyperlinks to the control engine 14 for consolidation and display by the user interface 12.

In an exemplary embodiment, the system 10 further manages and controls authentication when databases 18*a-h* are accessed by the translators 16*a-h*. Each of the translators 16*a-h*, before submitting a search request to its corresponding database, needs to establish an authenticated session with that database. The translator 16 performs the required sequence of page fetches, cookie management, and session ID management required to authenticate. Each database 18 is different and the translator 16 meets the specific requirements for that database. Sometimes this is simple, such as a userID/password login, and sometimes it can be quite complex involving a series of multiple Web page requests with both session IDs and cookies involved. The authentication process is executed without any user interaction.

The translator 16 can perform the authentication task much faster than a user with a browser would be able to because of a variety of optimizations used by the translators 16. These include ignoring nonessential Web page elements such as graphics, extraneous frames, etc.; the avoidance of nonessential steps that users otherwise would go through; caching of authentication information for multiple queries; and use of various network transaction optimizations such as redirect truncation, persistent connections, etc.

Translators 16 are designed to handle those databases 18 that provide both userID/password and IP authentication to meet different client needs. IP authentication is a mechanism by which the database only accepts connections from clients with specific Internet addresses such as a library or corporate network used by a subscriber. Thus the same translator 16 can be used in one environment that uses userIDs and passwords, and in a different environment where IP authentication is used. One search may involve the simultaneous use of several translators 16 using a variety of userID/password and IP authenticated mechanisms. This is all done in a manner that is totally transparent to the user.

In another exemplary embodiment, the system 10 includes an authentication manager. The authentication manager provides a means to access user authentication information stored in a central database. This enables, for example, a user to authenticate once to the system 10 using his/her library card number. The authentication manager then accesses a central database to acquire authentication information used to gain database access on the user's behalf. As a result, the system 10 is able to not only control access by users but to authenticate them in an appropriate manner to the various databases 18*a-h*.

In addition, the system 10 allows subsequent user requests such as fetching and displaying the next group of search results and fetching and displaying the full text for a selected search result. Like the original search, these activities need to incorporate proper authentication. The original search generates the session IDs and cookies for authentication and the translator 16 builds hyperlinks to the next-set and full-text resources using the authentication information. This is unlike the native direct database search where a single client session interacts with the database 18. Instead, the system 10 is working on behalf of many users in order to manage the authentication information for all the users simultaneously. This is accomplished by routing the next-set and full-text links back through the translator 16 and attaching the authentication information as extra link parameters. By attaching session information to the link, the system 10 is able to correctly manage large numbers of simultaneous sessions.

Figure 7:
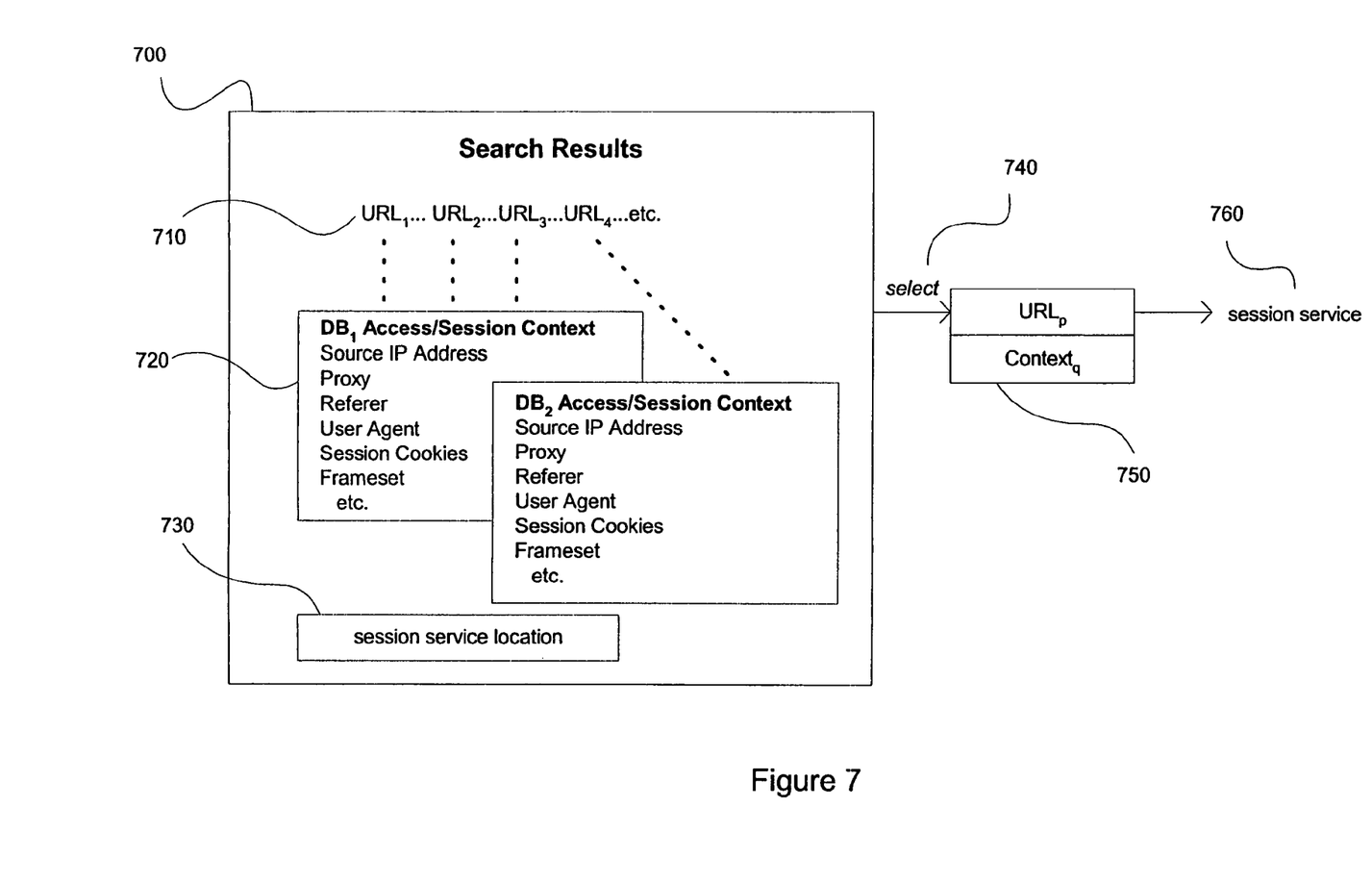
FIG. 7 is a simplified logical representation of a results page such as shown in FIG. 3.

FIG. 7 shows the components of the search results exemplified in FIG. 3. At 700 a search returning one or more results from one or more databases includes, in the results presentation, a set of Uniform Resource Locators (URL) at 710 that may, for example, be incorporated as hyperlinks on an HTML page.

Each URL is logically associated with an access/session context at 720 consisting of all data components required to gain access to the URL (such as proxy server, IP address, referring URL, authorization cookies, and so on) and session information describing the current state of the session (such as encompassing HTML frameset, session cookies, user-agent string, and so on). There is a one-to-one relationship between access/session contexts and databases returning search results. There is a many-to-one relationship between URLs and a context. Thus many URLs can be associated with one access/session context representing the database.

At 730 the search results presentation also includes information about where the session service is located that can subsequently be used to access components represented by the URLs for that search set.

At 740, when a user selects a specific URL to access, the URL is bundled with its associated access/session context in 750 and sent to the session service that will enable access to the database resource specified in the URL. In the exemplary embodiment, the bundling of URL and context is done via JavaScript functions and data components built into the search results by the search engine. Upon the user's action of selecting a URL to access (by clicking a hyperlink for example) JavaScript functions package the URL and context data into a standard HTTP POST method transaction sent via TCP over a network to the session service waiting to handle such requests.

Figure 8:
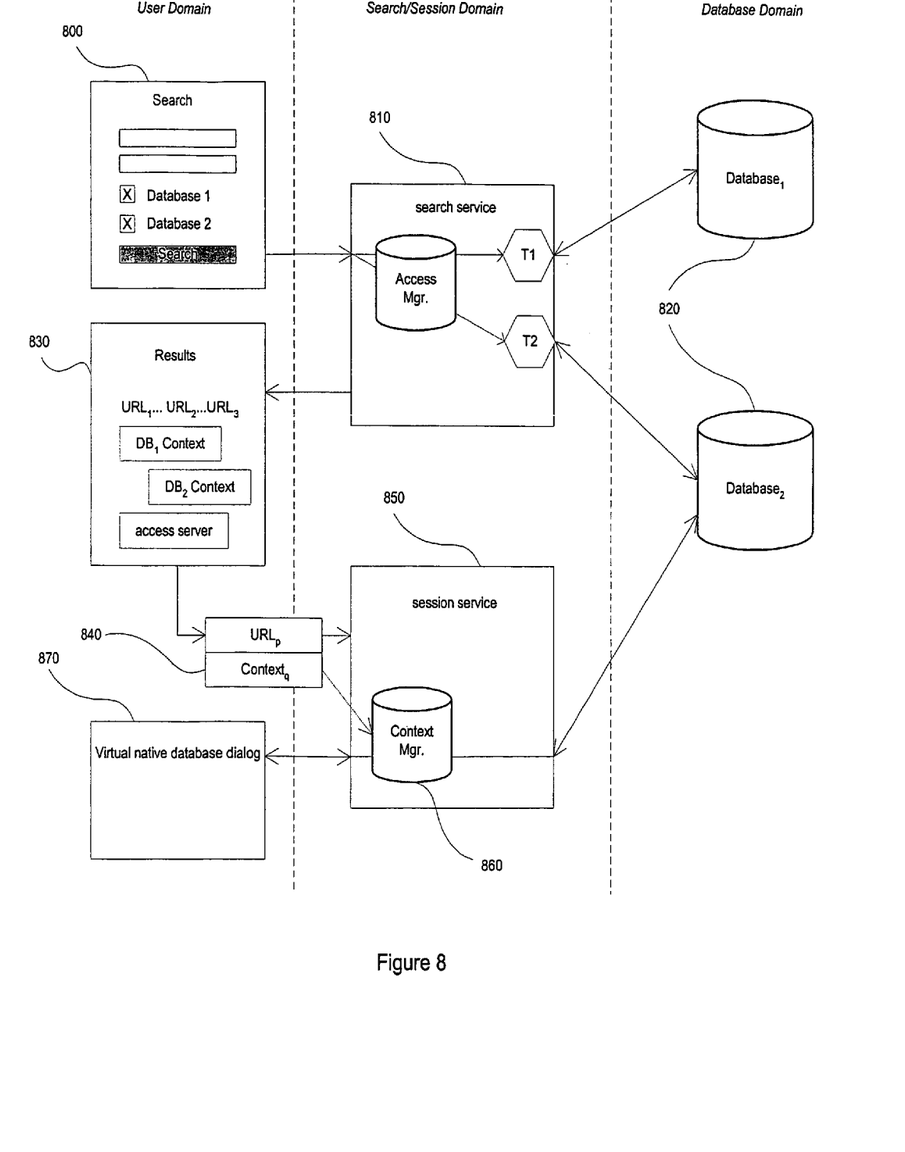
FIG. 8 is a diagram of an exemplary embodiment illustrating the overall search, selection, and virtual native access to a database.

FIG. 8 is a simplified overview of an entire search and database access incorporating both the search service to search multiple databases concurrently on behalf of the user, and the subsequent access to a particular database URL performed on behalf of the user by the session service.

At 800 is a simplified representation of a search interface (shown in detail in the example in FIG. 2) used to select multiple databases as the object of a user search. At 810, the search service accepts the request, performs required user authentication, looks up access information for each of the participating databases, and assigns participating translators the task of performing the dialog with their respective databases at 820 to authenticate, perform the specified search, and parse the results.

At 830 the search service has packaged up the search results for presentation directly or indirectly to the user. The results package includes the data elements and functions described for FIG. 7.

When a user selects one of the search result URLs for viewing (such as by clicking a hyperlink on the HTML page), the associated data elements are packaged at 840 and sent to the specified session service at 850.

The session service parses the URL and context components, storing the context into its own internal database at 860 for use throughout a user/database dialog. It then connects to the target database, uses the session context information to reestablish the database state, and requests the data specified in the URL. When the database returns the data (usually HTML and related components), the session service rewrites any imbedded URLs to point back to the session service rather than directly to the database. This enables the session service to maintain the access and state information for the lifetime of the user/database dialog.

At 860, the user is presented with what appears to be the database's native content. Because of the internal links being rewritten, and the session state being maintained by the session service, the user is able to continue using this virtually native dialog transparently through the session service as if using the native database directly.

Many alternative embodiments exist for various aspects of the session service. While the exemplary embodiment implies that the session service is separate and independent of the search service, it can in fact reside co-resident on the same server, on a different server, or could be functionally incorporated into the search service itself.

The data elements used to initiate a virtual database dialog, consisting of the URL and context components, can be embodied in a number of ways. Alternatives in use include HTML data and JavaScript function calls, JavaScript data structures with JavaScript function calls, and XML data markup with external parser and application logic. The means by which the URL/context information is packaged and managed is irrelevant as long as the user agent is able to build the HTTP POST request to the session service including the data elements in the expected format.

Another embodiment keeps the logical association of URL and context data but breaks their physical proximity by incorporating a URL and reference to the context rather than URL and context directly. This enables the context information to be stored independent of the user results presentation. The association between URL and context is then made via the reference by the session service.

In all cases, the common aspects of the embodiments include the search service's building of contexts during search activities, creating URL/context representations and logical associations during the construction of the search results, the use of the URL/context data associations by the session service, and the enabling of a continuing virtually-native dialog between user and database by way of the state-managed session service.

Thus, specific embodiments and applications of systems and methods for managing database authentication and sessions have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A database authentication and session management system comprising computer hardware and software including at least one processor and a memory embedded with computer instructions that are executed by the at least one processor that manages authorization and session management steps for a user to access and search a plurality of databases, including:
   bundling authentication and functional session context information for each search result returned from each of the plurality of databases, wherein each bundled authentication and functional session context information is unique to a single user session and each database returning search results, and is associated with any full-record URLs targeted to each database;
   transferring one of the bundled authentication and functional session context information, along with a target URL associated with one of the plurality of databases, to a session manager for management of a full-record native database session for the one of the plurality of databases associated with the target URL;
   reconstructing and managing the authentication and functional session context information for the one of the plurality of databases associated with the target URL within the session manager, and using the reconstructed authentication and functional session context information for a full-record access to the one of the plurality of databases associated with the target URL without re-authenticating or backtracking within a session dialog.

2. A computerized method that manages authorization and session management for a user to access a plurality of databases, performed by at least one processor and a memory embedded with computer instructions that are executed by the at least one processor, the method comprising the steps of:
   searching the plurality of databases via a plurality of translators, wherein each translator obtains and uses access information and session information relating to a corresponding database to perform the search;
   parsing search results from the plurality of databases via the plurality of translators, wherein each of the search results includes a full-record URL associated with one of the plurality of databases;
   bundling authentication and functional session context information for each search result returned from each of the plurality of databases, wherein each bundled authentication and functional session context information is unique to a single user session and each database returning search results, and is associated with each full-record URL targeted to each database;
   transferring one of the bundled authentication and functional session context information, along with a target URL associated with one of the plurality of databases, to a session manager for management of a full-record native database session for the one of the plurality of databases associated with the target URL;
   reconstructing and managing the authentication and functional session context information for the one of the plurality of databases associated with the target URL within the session manager, and using the reconstructed authentication and functional session context information for a full-record access to the one of the plurality of databases associated with the target URL without re-authenticating or backtracking within a session dialog.

* * * * *